US006842960B2

(12) United States Patent
Jordan et al.

(10) Patent No.: US 6,842,960 B2
(45) Date of Patent: Jan. 18, 2005

(54) METHOD OF FEEDING STRAND INTO A MOLD

(75) Inventors: A. Kenneth Jordan, Arlington, TX (US); James L. Dietrick, Kennedale, TX (US)

(73) Assignee: Hamilton Form Co., Inc., Ft. Worth, TX (US)

( * ) Notice: Subject to any disclaimer, the term of this patent is extended or adjusted under 35 U.S.C. 154(b) by 0 days.

(21) Appl. No.: 10/302,750

(22) Filed: Nov. 22, 2002

(65) Prior Publication Data

US 2003/0151164 A1 Aug. 14, 2003

Related U.S. Application Data

(63) Continuation-in-part of application No. 09/994,904, filed on Nov. 27, 2001.

(51) Int. Cl.[7] ......................... B28B 23/06; B28B 23/18; B29C 70/56; B29C 70/26

(52) U.S. Cl. ......................... 29/452; 264/228; 264/229; 425/111; 425/126.2; 242/128; 254/29 A

(58) Field of Search ................................ 264/228, 229; 29/452; 425/111, 126.2; 242/128; 254/29 A

(56) References Cited

U.S. PATENT DOCUMENTS

| | | | | | |
|---|---|---|---|---|---|
| 2,863,206 | A | * | 12/1958 | Adolf | 425/111 |
| 3,055,073 | A | * | 9/1962 | Gerwick, Jr. | 264/145 |
| 3,524,228 | A | * | 8/1970 | Kelly | 403/369 |
| 3,719,982 | A | * | 3/1973 | Tindal | 29/452 |
| 3,785,617 | A | * | 1/1974 | Friedrich | 254/1 |
| 3,792,821 | A | | 2/1974 | Fallon | 242/42 |
| 3,827,132 | A | * | 8/1974 | Bratchell | 29/433 |
| 3,897,914 | A | | 8/1975 | McCarthy et al. | 242/129.6 |
| 3,975,815 | A | * | 8/1976 | Mori | 29/433 |
| 4,095,326 | A | * | 6/1978 | Harvey | 29/417 |
| 4,290,991 | A | * | 9/1981 | Thim | 264/157 |
| 4,534,310 | A | | 8/1985 | Quick | 118/620 |
| 4,726,560 | A | * | 2/1988 | Dotson | 249/43 |
| 4,884,958 | A | | 12/1989 | Lowndes, III et al. | 425/62 |
| 4,953,280 | A | * | 9/1990 | Kitzmiller | 29/412 |
| 4,999,150 | A | * | 3/1991 | Bevan | 264/257 |
| 5,031,847 | A | | 7/1991 | Tanaka | 242/54 R |
| 5,509,759 | A | | 4/1996 | Keesling | 405/232 |
| 5,595,355 | A | | 1/1997 | Haines | 242/470 |

FOREIGN PATENT DOCUMENTS

EP 0 441 029 A1 8/1991

* cited by examiner

*Primary Examiner*—Michael P. Colaianni
*Assistant Examiner*—Michael I. Poe
(74) *Attorney, Agent, or Firm*—Thompson & Gustavson, L.L.P.

(57) ABSTRACT

A method is disclosed to feed strand (30) through apertures (214) in bearing plates (60) and bulkheads (202) in a mold (62). A collar (210) can be attached to a rod (208) for limited motion relative thereto, including rotation relative the rod about its elongate axis. The end (96) of the strand (30) is received in a cylindrical receptacle (232) in the collar and the strand can then be used to push the rod, collar and strand through the apertures. A strand feeder rack (56) can be used to simultaneously feed a number of strands.

12 Claims, 8 Drawing Sheets

METHOD OF FEEDING STRAND INTO A MOLD

CROSS REFERENCE TO RELATED APPLICATION

This application is a continuation-in-part of copending U.S. patent application Ser. No. 09/994,904 filed Nov. 27, 2001.

TECHNICAL FIELD

This invention relates to the molding of concrete products, particularly large concrete products such as double T's, pilings, beams and the like.

BACKGROUND OF THE INVENTION

Large concrete products are typically cast in molds. The process of casting is used to make large concrete products such as beams for use in highway bridges, tunnel liners, building construction and the like. Many of these concrete products have tensioned steel strands therein to prestress the concrete product. The steel strands are placed in the mold and tensioned before the concrete is poured in the mold. As the concrete cures, the steel strand and concrete bond and the tension in the strand creates the prestress in the concrete product. Each of the strands is typically tensioned by 30,000 pounds force. Often, the strands are also tensioned perpendicular to their length into a slight V shape near the middle of the mold to provide negative loading at the top of the concrete product.

In a self stressing mold, bearing plates(sometimes referred to as jacking plates) are placed at the ends of the mold and the ends of the strands in the mold pass through aligned holes in the plates and extend outwardly from the plates a length sufficient to allow a hydraulic cylinder or other tensioning device to grasp an end of the strand to tension the strand. Once tensioned, conical wedge type strand chucks acting between the strand and the plates maintain the tension. Because the tension in the strands is passed through the plates, and the plates engage the mold, the tension, in turn, passes through the mold. In such a design, the mold must be sufficiently strong to absorb these stresses.

In other applications, external abutments may be provided at each end of the mold to tension the strands passing through the mold. The external abutments are supported in the ground at the mold site or supported by other structures. In this design, no bearing plates are necessary. The mold is not exposed to the tension forces in the strands and consequently need not be designed to withstand those stresses.

A typical concrete product is a T or double T molded in a long T or double T-shaped mold which may use 2 to 10, or more, tensioning strands in each leg of the T, for example. The mold is often sufficiently long to mold a number of concrete products simultaneously therein along the length of the mold. For example, a mold may be over 400 feet long, and used to mold up to ten 40 foot long T or double T concrete products simultaneously. The ends of the concrete products are formed by headers or bulkheads inserted into the mold at the desired spacing to confine the liquid concrete as it is poured into the mold. The bulkheads are commonly formed of two pieces of ⅜ inch thick plate spaced about 12 inches apart. Each plate forms the end of a particular molded product, with the 12 inch separation between plates so that a worker can get into the space between the plates to cut the strand with a cutting torch or other cutter when removing the products from the form after partial curing of the concrete in the product.

The concrete products are commonly reinforced by rebar or mesh. Commonly, such T or double T molds are self stressing and the concrete products are prestressed by tensioned steel strand passing through bearing plates at the ends of the mold, the headers and the concrete product from end to end, which bonds to the concrete as the concrete cures. The bearing plates hold and distribute the tensioning forces in the steel strand. The bearing plates are typically steel about 4 inches thick to resist the tensioning forces exerted.

Molds for a large, 120 foot long highway I beam, using perhaps 60 separate steel strands, each ⅜, ½, or 9/16 inch in diameter, for example, are not self stressing. The strands are drawn through the mold (passing through aligned holes in any headers used) and tensioned between external abutments.

As each strand will usually be at least as long as the mold, say 400 to 500 feet, with some extra length to extend out the ends of the bearing plates or to the external abutments, the difficulty of manipulating such strand lengths can be appreciated. In the past, if 60 strands were needed in the concrete product, 60 separate strand packs could be positioned at the mold site. Similarly, a double T may use 12 separate strands, 6 for each of the two legs of the double T, requiring 12 separate strand packs to be positioned at the mold site.

At present, each strand must be pulled off the strand pack manually and fed first through the bearing plate at the near end of the mold, and then sequentially through each side of the bulkheads in the mold, before finally being fed through the bearing plate at the opposite end of the mold. Generally, the bulkheads are moved close to the near end so that the strands can be manually fed through the near bearing plate and bulkheads with a minimum amount of strand payed off the strand pack. Typically, all the strands to be used in the molding process are manually fed through the near bearing plate and the bulkheads and then a crane or similar device is used to pull the strands and bulkheads simultaneously down the length of the mold, positioning each bulkhead at the proper spacing along the mold and eventually allowing the strands to be fed through the bearing plate at the far end of the mold and tensioned.

The manual operation of feeding the strands through the bearing plates and bulkheads is expensive, time consuming and potentially dangerous. The strand, commonly ½ inch in diameter, is hard to move and manipulate, weighing ½ lb/foot of length. As the strand is payed out from the strand packs, it must rotate or spin to undo the winding of the pack, causing additional difficulties. For a ½ inch diameter strand, the apertures through the bearing plates and bulkheads through which it must be fed are only about ⅝ inch in diameter, leaving little clearance in the installation. It is also critical to avoid cutting or nicking the strands in the installation, as a nick or cut with high tension loading can be the initiation site of a possible strand failure. The molds are often coated with a release agent, making the mold surfaces slippery, and causing additional difficulties for the installation crew.

The apertures in each bearing plate and bulkhead are formed in the particular pattern that the strands will be used in the molded product. For example, for a simple T, there may be six strands in the leg, positioned two to a row in three vertical columns. Occasionally, one strand may be installed in misaligned apertures as it is being fed through the bearing plates and bulkheads, forcing the installation crew to redo the work already done to correct the error, or, if not caught, having an inferior product.

An improved technique is needed to fed the strands through the bearing plates and the bulkheads. The improvement should be less expensive and more reliable than the present manual operation.

SUMMARY OF THE INVENTION

In accordance with one aspect of the present invention, an apparatus is provided to pass strand through apertures in members in a mold. The apparatus includes a first portion forming a rod having a diameter sized to pass through the apertures, the rod having a first end and a second end. The apparatus further has a second portion forming a collar at the second end of the rod. The collar defines a receptacle to receive an end of a strand. The collar also has a diameter sized to pass through the apertures.

In accordance with another aspect of the invention, the rod can be tapered, and the collar is mounted to the rod permitting rotation of the collar relative to the rod about an elongate axis of the collar. The apparatus can include a bolt mounting the collar to the rod while permitting the collar to rotate relative to the rod about the elongate axis of the collar. The collar can have a receptacle portion having a cylindrical exterior surface and a forward portion having a tapered exterior surface. The collar can define an interior cylindrical surface for receiving the end of the strand, and a passage extending from the forward end of the collar to a tapered interior surface. The head of the bolt bears against the tapered interior surface and the length of the bolt extends through the passage exterior the collar to thread into the rod. The bolt and passage are sized to permit both limited angular and parallel misalignment of the elongate axes of the rod and collar.

BRIEF DESCRIPTION OF THE DRAWINGS

A more complete understanding of the invention and its advantages will be apparent from the following Detailed Description, taken in conjunction with the accompanying drawings, in which.

DETAILED DESCRIPTION OF THE INVENTION

Figure 1A:
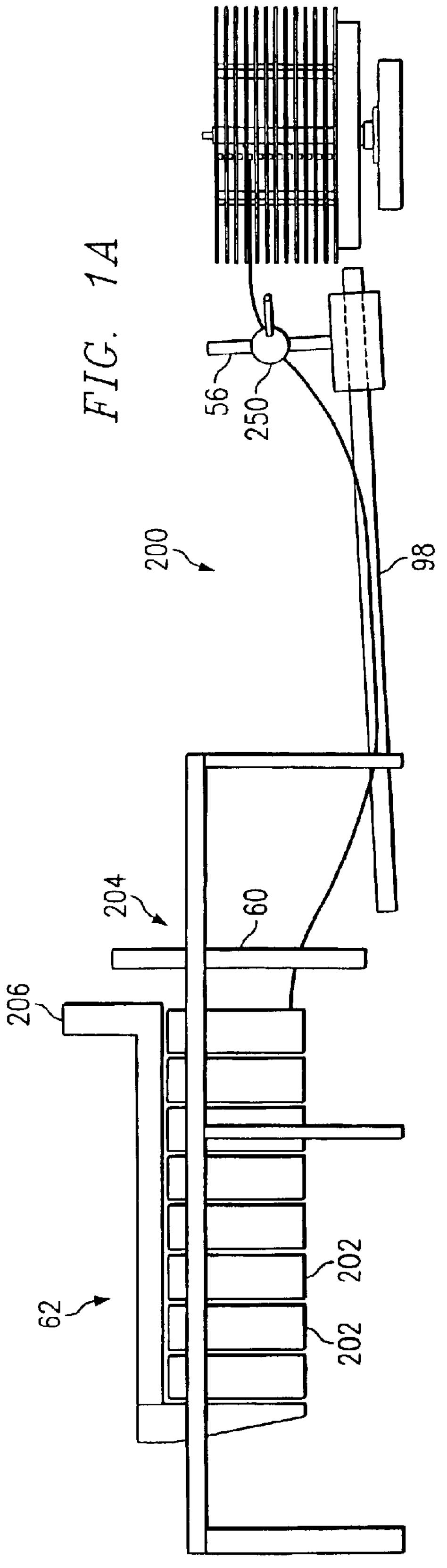
FIG. 1A is a side view of an apparatus for feeding strand in a mold forming a first embodiment of the present invention.
Figure 1B:
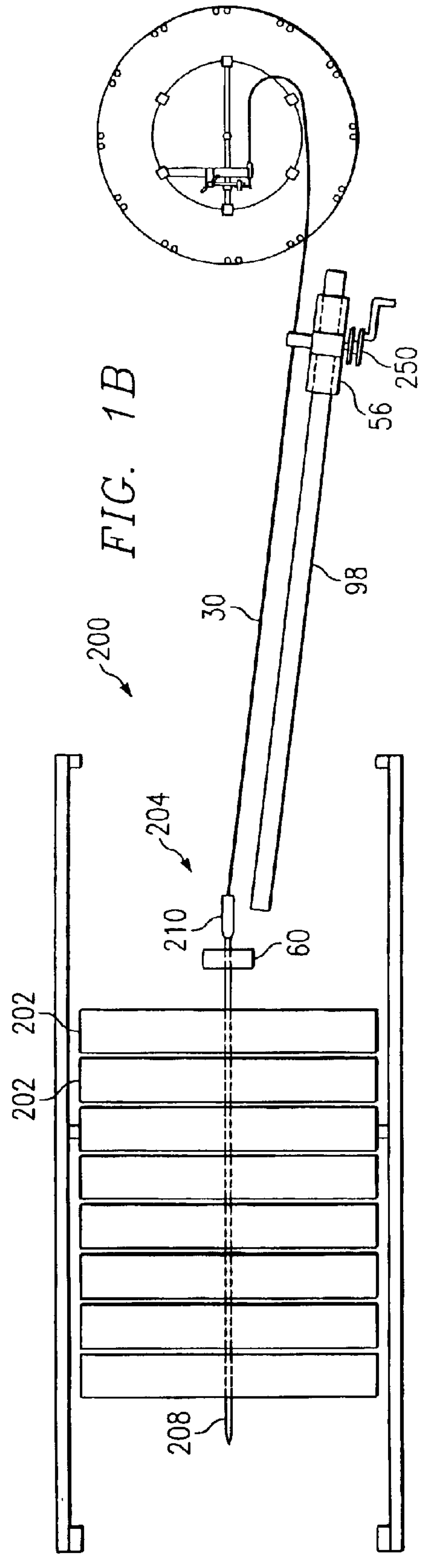
FIG. 1B is a top view of the apparatus for feeding strand in a mold forming a first embodiment of the present invention.

In accordance with the present invention, a strand feeder device 200 is disclosed which increases efficiency in feeding strand 30 from strand packs 46 through the bearing plates 60 and bulkheads 202 of a mold for molding concrete products. The strand feeder device 200 can be utilized with conventional molding operations, where many strand packs 46 are positioned at the near end 204 of the mold 62 and the strands are drawn from each strand pack 46 and fed through the mold 62. It can also be used with an improved molding operation described in greater detail hereinafter and forming the subject of copending U.S. patent application Ser. No. 09/953,474 filed Sep. 12, 2001.

Figure 1C:
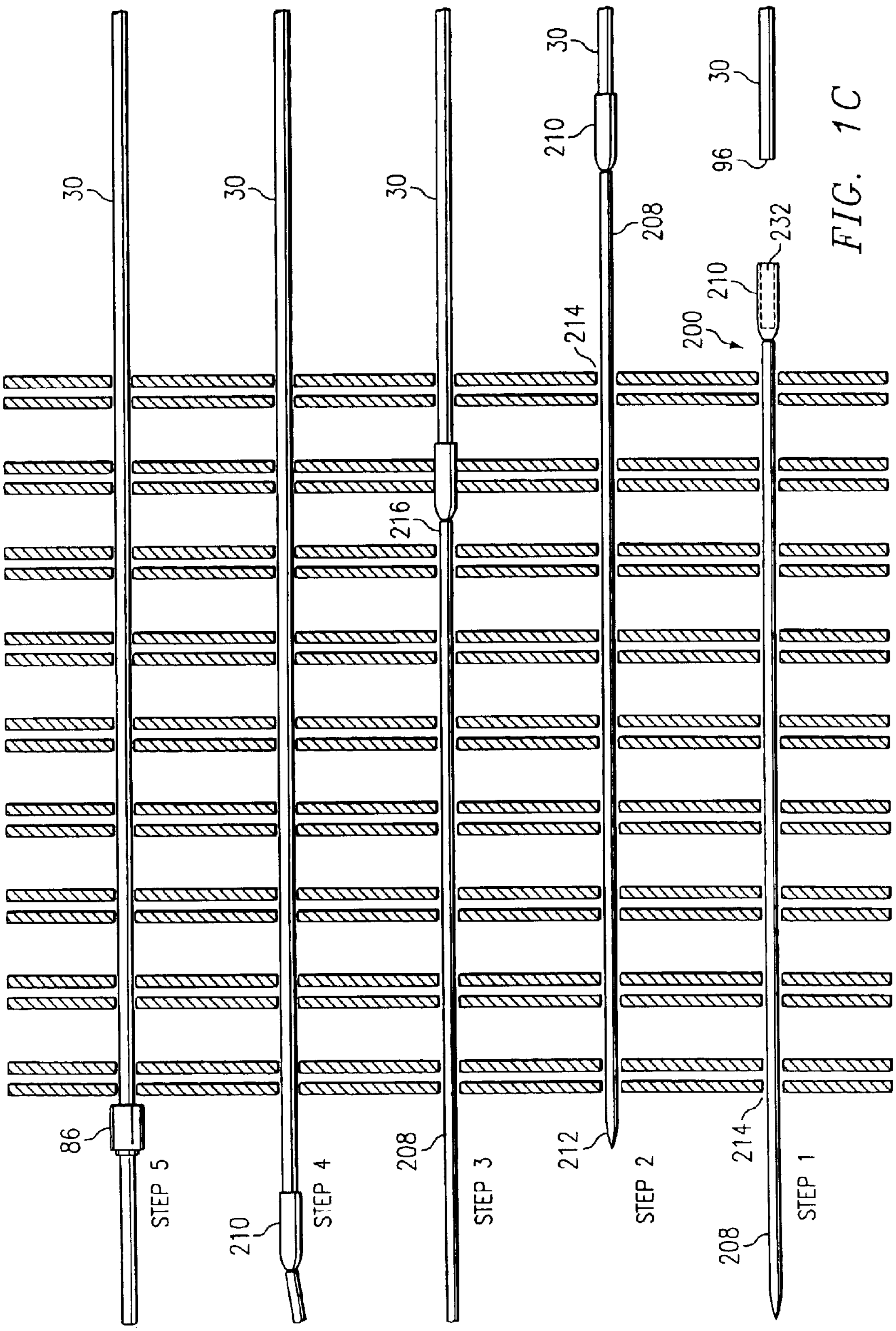
FIG. 1C illustrates the insertion of the strand in the mold.
Figure 1D:
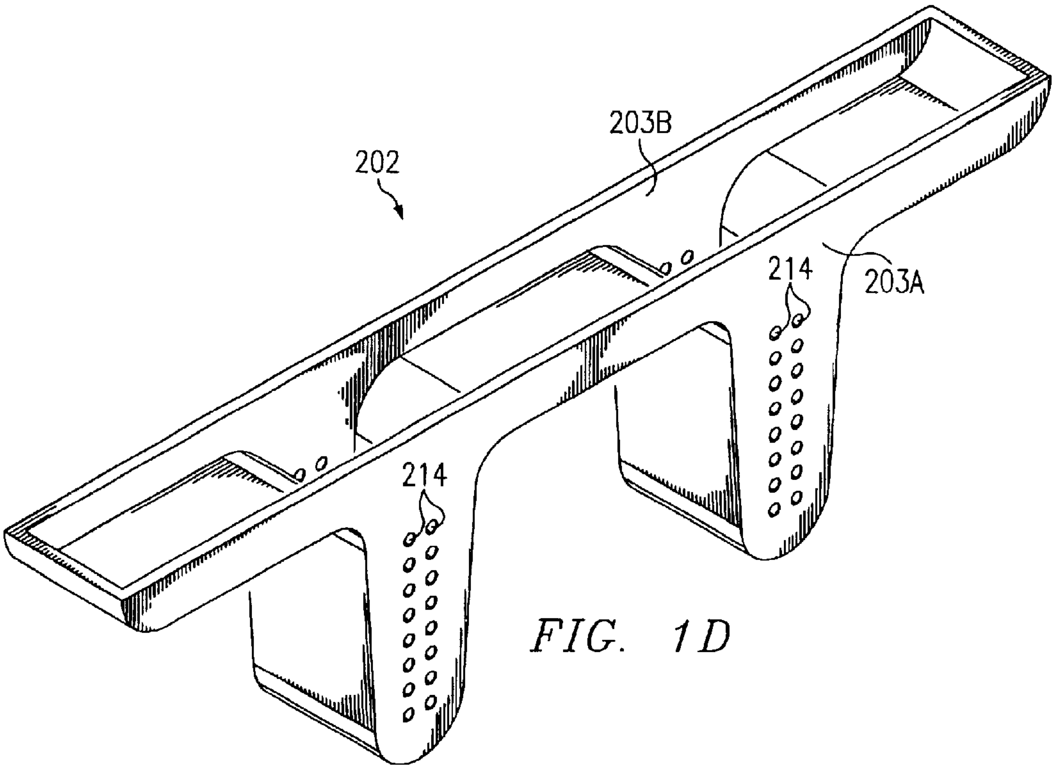
FIG. 1D is a perspective view of a typical bulkhead used in a mold.

With reference to FIGS. 1A-1E, the strand feeder device 200 is used with mold 62 which has bearing plate 60 at the near end 204 of the mold 62 and a series of bulkheads 202 to separate individual molding sections. The bulkheads 202 are generally moved adjacent the near end 204 of the mold 62 with overhead crane 206 to facilitate the feeding of the strand 30 through the bulkheads. As can be seen in FIG. 1D, the typical bulkhead 202 has two parallel plates 203A and 203B spaced 12 inches apart. As described, currently, each strand is manually payed off its stand pack 46 and fed through aligned apertures 214 in the near end bearing plate 60 and bulkheads 202 in sequence, a lengthy and tedious job.

Figure 1E:
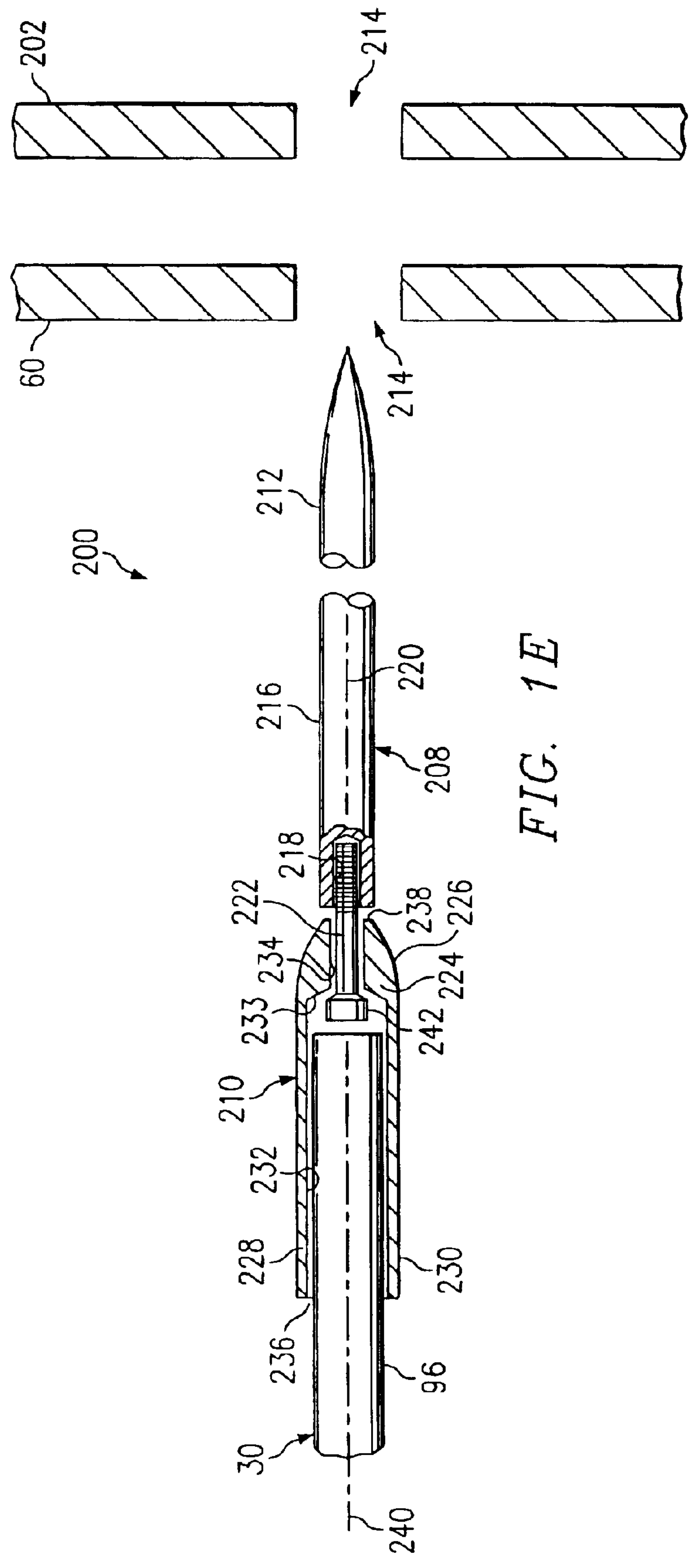
FIG. 1E is a cross-sectional view of the rod and collar used in the first embodiment of the present invention.

In accordance with the present invention, a rod 208 and associated collar 210 are used with each strand 30 to be fed into the mold to simplify the operation. With reference to FIG. 1E, the rod 208 can be seen to have a pointed forward end 212 which allows the rod to more easily enter the apertures 214 in the bearing plates 60 and bulkheads 202. The rod 208 has a rearward end 216 with a threaded aperture 218 formed therein aligned along the elongate axis 220 of the rod 208. Collar 210 is attached to the rod 208 by a capscrew 222 threaded into the aperture 218. The collar 210 has a forward portion 224 defining a tapered exterior surface 226, and a cylindrical portion 228 defining a cylindrical exterior surface 230. The collar 210 is formed with an interior that includes a cylindrical receptacle 232 which opens through the rear 236 of the collar 210 to receive the end 96 of the strand 30, a tapered surface 233 and a passage 234 which opens through the front 238 of the collar 210. The receptacle, tapered surface and passage are all centered along the elongate axis 240 of the collar 210. The exterior dimensions of both the rod 208 and collar 210 are sized so that they can pass through the apertures 214 in the bearing plates 60 and bulkheads 212.

The capscrew 222 is inserted in the interior of the collar from the rear 236 and into the passage 234 so that a portion of the threaded end of the capscrew extends exterior the passage 234. The exposed portion is threaded into aperture 218 of the rod 208. The head 242 of the capscrew bears against the tapered surface 233 of the collar 210. The depth of the aperture 218 is preferably sized so the threaded end of the capscrew bottoms out at the end of the aperture 218 which allows some movement to be permitted between rod 208 and collar 210 along their respective axes 220 and 240 and permits the collar to rotate about its axis 240 relative the rod 208. Also, the head 242 is preferably ground to remove the sharp edge on the underside of the head so that it can move more freely relative the tapered surface 233. Further, the diameter of the passage 234 is sufficiently larger than the diameter of the threaded portion of the capscrew to allow limited misalignment of the axes 220 and 240 of the rod 208 and collar 210 in both an angular fashion, where the axes 220 and 240 intersect at an angle, and a parallel fashion, where the axes 220 and 240 are parallel but spaced apart from each other. The misalignment can be both angular and parallel simultaneously. While it is preferred to have rod 208 and collar 210 formed of separate elements, it is possible the rod and collar could be made in one integral piece, of a material with sufficient flexibility to be inserted through the apertures in the bearing plates and bulkheads. If made as an integral piece, the rod portion and collar portion can have the same outer diameter, or the rod portion can be formed with a smaller diameter which tapers outwardly to the larger diameter collar portion, for example.

To install the strand 30, a rod 208 is fed through the bearing plates 60 and bulkheads 212 so that the collar 210 extends exterior the near bearing plate 60 as seen in FIG. 1C, step one. Then, the appropriate strand 30 is payed off a strand pack 46 to move the exposed end 96 of the strand 30 to the collar 210. The end 96 of the strand 30 can simply be inserted into the cylindrical receptacle 232, or the rod 208 and collar 210 can be backed out of the mold to slide the cylindrical receptacle 232 over the end 96 as seen in step two of FIG. 1C. In either case, the end 96 bottoms out against the capscrew 222 and tapered surface 233 as it enters cylindrical receptacle 232. The diameter of cylindrical receptacle 232 is sized to frictionally engage the end 96 of the strand 30. It may be desirable to treat the end 96 of the strand with a grinder or similar tool to remove any burrs or ridges that would prevent the end 96 from entering the cylindrical receptacle 232. The end 96 could be chamfered with the tool, if desired. The installer then can grasp the strand 30 immediately behind the exposed end 96, with the rod and collar thereon, and easily insert the strand sequentially through the appropriate apertures 214 of the headers and bulkheads by pushing forward with the strand 30. By pushing on the strand 30, the rod 208 and collar 210 thereon are pushed through the apertures, with the strand 30 naturally following the rod 208 and collar 210 so that the strand 30 itself is fed through the apertures as seen in steps three and four of FIG. 1C. Once the stand 30 is completely inserted through the bearing plates 60 and bulkheads 202, as seen in step four of FIG. 1C, the rod 208 and collar 210 can be removed and a strand chuck 86 can be installed as seen in step five of FIG. 1C.

As noted, as the strand 30 is payed off the strand pack 46, it will slowly rotate to unwind itself from the pack. As the collar 210 can freely rotate about its axis 240 relative the rod 208, the strand 30 and collar 210 can rotate together as needed as the strand is payed out without requiring rod 208 to rotate as well. Since the collar 210 has some freedom of motion relative to the rod 208, the feeding of the rod, collar and strand through the apertures is easier. Further, the pointed forward end 212 of the rod 208 and tapered exterior surface 226 of the collar 210 facilitate passage of the rod and collar through the apertures. More particularly, if two bulkheads or a bearing plate and bulkhead are close, and the apertures 214 in each slightly misaligned, the collar can move so that its axis 240 is at an angle relative to the axis 220 and/or spaced from but parallel to axis 220 of the rod 208 to accommodate the misalignment. When the rod and collar are fed completely through the apertures in the bearing plate and bulkheads so that the end 96 of the strand 30 itself extends completely through, the rod 208 and collar 210 can simply be pulled off the end 96 of the strand 30, and used to feed the next strand 30.

When all the strands 30 have been fed through the near bearing plate 60 and the bulkheads 202, the crane 206 is typically used to pull the bulkheads 202 along the mold to their final positions for the molding operation, pulling the strands 30 therewith. The strands 30 can then be tensioned as required.

In one specific device constructed in accordance with the teachings of the present invention for use with strand of ½ inch diameter with bearing plates and bulkheads having apertures of ⅝ inch diameter, the rod 208 was fifteen feet long and had a diameter of ⅜ inch. The rod was mild steel rod, for example a 1015 or 1020 steel. The collar had an external cylindrical surface of $^{21}/_{32}$ inch diameter and a cylindrical receptacle of 0.513 inches diameter. The collar was about 3½ inches long with the cylindrical receptacle being about 3 inches long and the passage 234 being about ½ inch long. The capscrew was a ¼ by 28 NF capscrew and the passage 234 had a diameter of $^{5}/_{16}$ inch.

Figure 5:
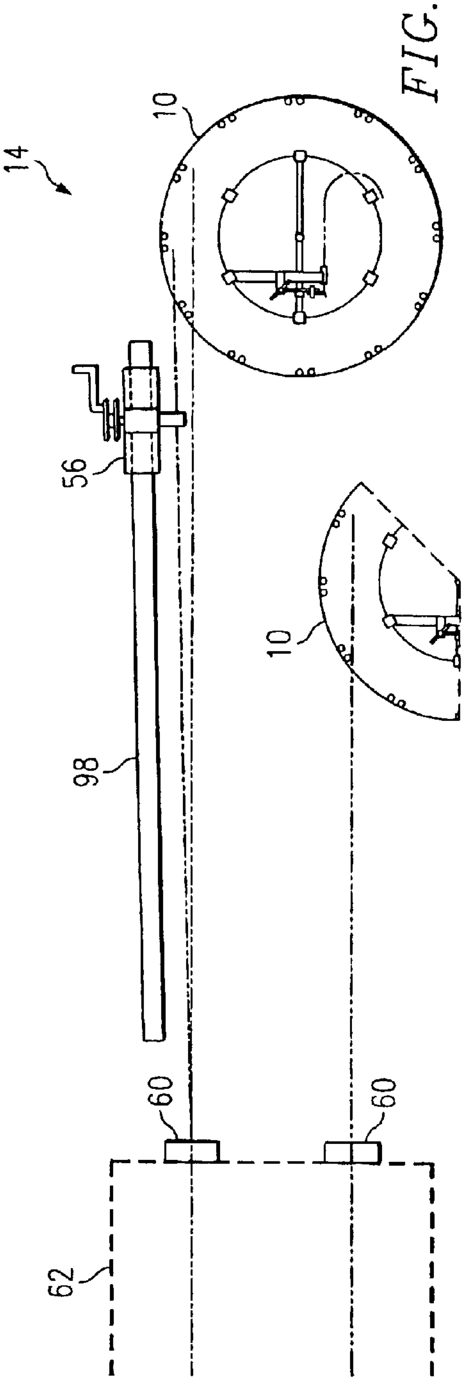
FIG. 5 is a partial plan view of the portion of the mold location illustrating the relationship between a strand reel and strand feeder device.
Figure 7:
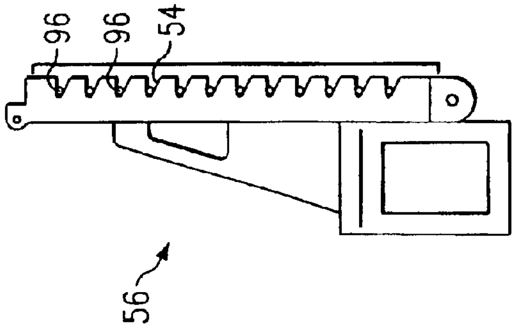
FIG. 7 is a front view of the strand feeder device.
Figure 6:
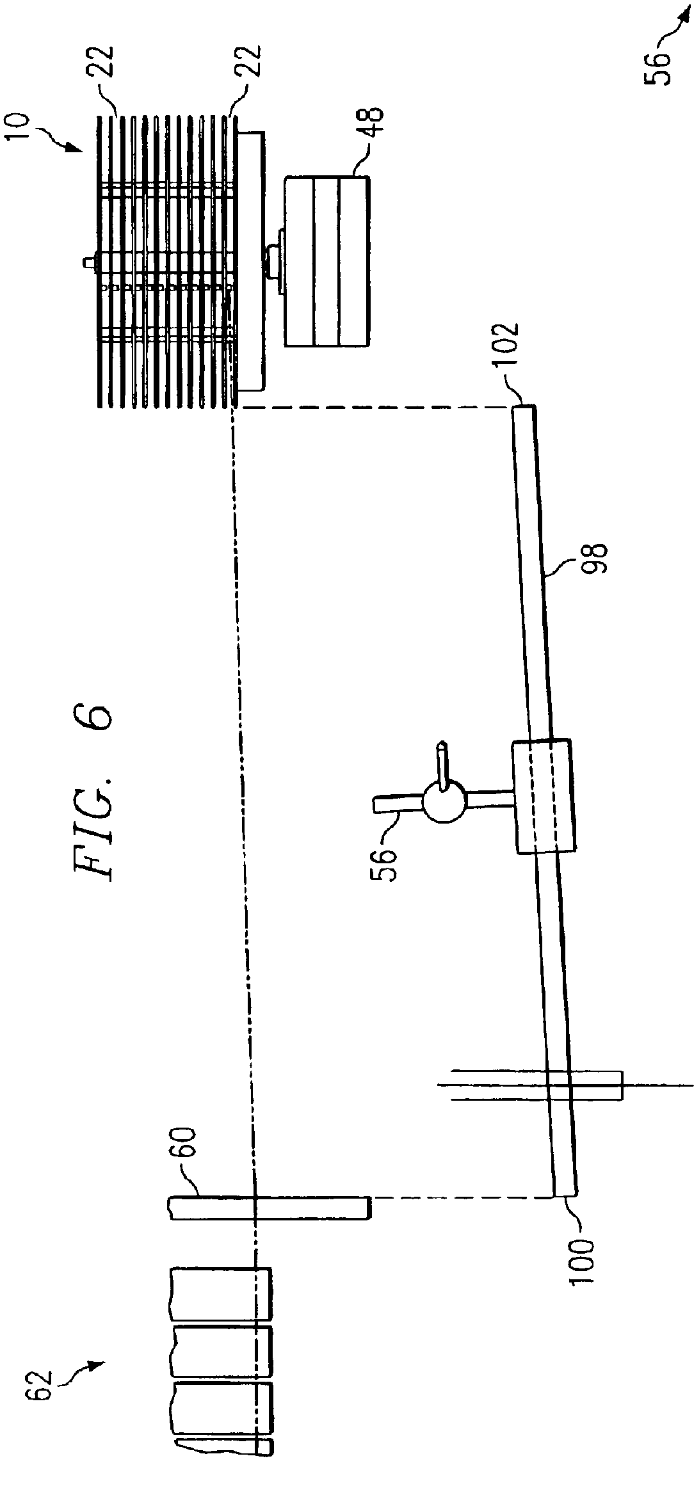
FIG. 6 is a side view of the portion of the mold location illustrating the relationship between the strand reel, feeder ramp and mold.
Figure 8:
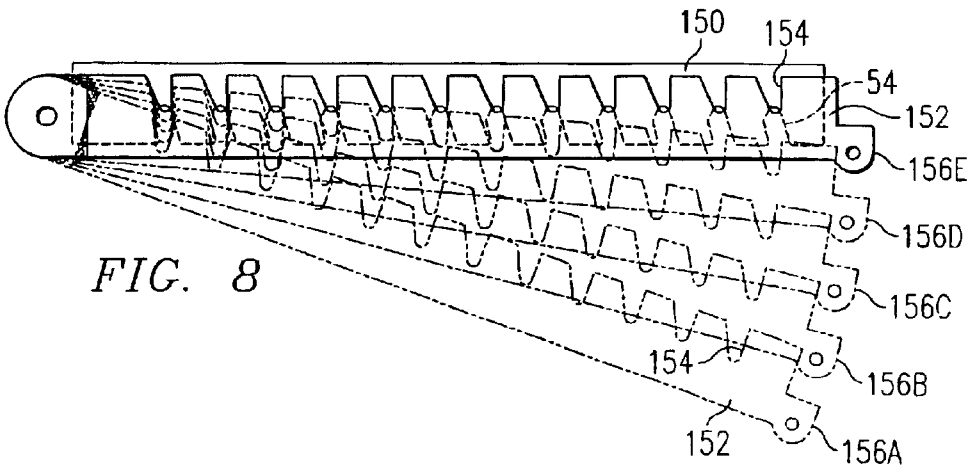
FIG. 8 is an illustrative view of a portion of the strand feeder device.
Figure 9:
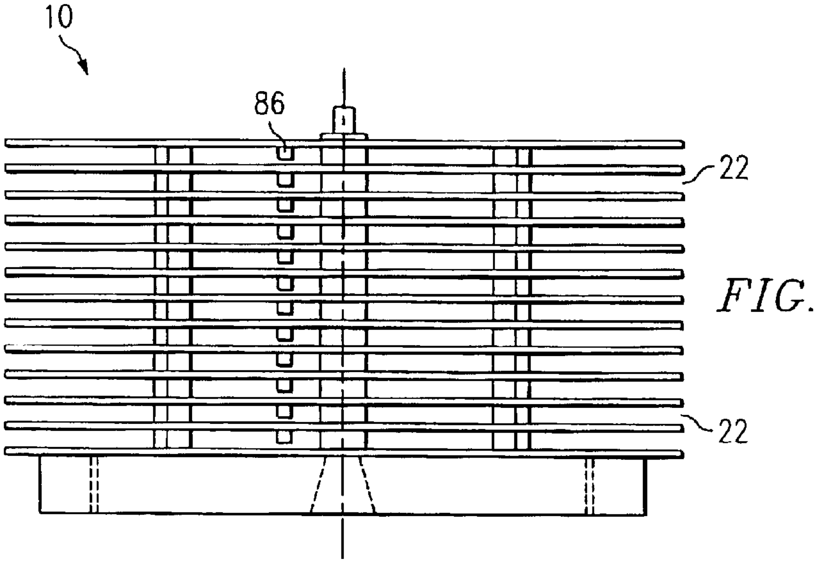
FIG. 9 is a side view of the strand reel.

While the rod 208 and collar 210 can be used individually to manually feed the strand 30 into the mold, it is possible to use strand feeder rack 56 as shown in FIGS. 5, 6, 7 and 8 in association with a rod 208 and collar 210 for each strand to be fed. The strand feeder rack 56 is mounted for sliding motion on a track 98 for movement from a position adjacent the strand packs 46 to a position adjacent the near bearing plate 60, as seen in FIGS. 5 and 6. The strand feeder rack 56 has a stationary arm 150 having a series of slots 54 spaced vertically thereon, each slot 54 designed to receive the end of one of the strands. The ends 96 of each of the strands 30 are pulled from each of the strand packs to about a foot from the near bearing plate 60 at the near end 204 of the mold(a distance of about 15 to 17 feet, typically)and strands 30 are then placed in the slots 54 while the strand feeder device 56 is in the position adjacent the strand packs 46. A pivoting arm 152 with slots 154 is pivoted to the stationary arm 150 at one end thereof. As the strand ends 96 are inserted in the slots 54, the arm 152 is pivoted out of the way. Once the strands 30 are in the slots 54, the arm 152 is pivoted through positions 156A–E to capture the strands 30 in a wedging action between slots 54 and 154. The pivoting arm 152 is held in the wedging position 156E with a locking mechanism.

The strand feeder rack 56 is mounted for sliding motion on the track 98, which is tilted downwardly toward the near bearing plate 60. The strand segments are secured to strand feeder rack 56. The strand feeder rack 56 is pulled down the track 98 a short distance with the strand segments clamped in the slots until the ends 96 are proximate the collars 210 and associated rods 208 which have previously been inserted into apertures 214 as seen in step one of FIG. 1C. The collars 210 and rods 208 can then be slid out of the apertures sufficiently to slide collars 210 over the ends 96 of the respective strands 30, as seen in step two of FIG. 1C. The strand feeder rack 56 can be pulled the full length down the track 98 with a simple hand cranked winch or come-along device 250, by a powered device such as a hydraulic or electric motor, or manually. The rack 56 feeds the rods 208 and strands 30 through the bearing plates 60 and bulkheads 202. The strands 30 automatically are payed off the strand packs as the strand feeder rack 56 moves down the track. When the strand feeder rack 56 is proximate the near bearing plate 60, the pivoting arm 152 can be pivoted to release the strands and the strands are now fully thru the bearing plates 60 and bulkheads 202 and are ready to be moved into final position along the form.

In accordance with one device constructed in accordance with the teachings of the present invention, the track 98 was 17 feet long and was positioned with end 100 about 4 inches from the bearing plate 60 and the end 102 close to the strand packs 46. The track 98 is formed from a 4 inch by 6 inch tube rectangular tube. The strand feeder rack has 12 slots 54 spaced 2 inches apart vertically. The track sloped from a height of about 1 foot 11 inches at the end 102 to about 8 inches at end 100.

As noted, the advantages of the present invention can be used with a conventional molding operation where a strand pack is positioned at the near end of the mold for each strand to be used in the molding process. However the invention also contemplates the premeasuring and precutting of strand 30 in an assembly facility 12 remote from the mold site 14 and filling one or more multiple strand reels 10 (FIG. 2A) with, for example, eight or twelve of the premeasured, precut strand segments in a like number of individual slots in the reel. The strand reels 10 are then transported to the mold site. At the mold site, the free ends of the strand lengths stored on a strand reel 10 can be pulled out simultaneously for feeding through the mold by using the rods 208 and collars 210, with or without the use of the strand feeder rack 56.

Figure 2A:
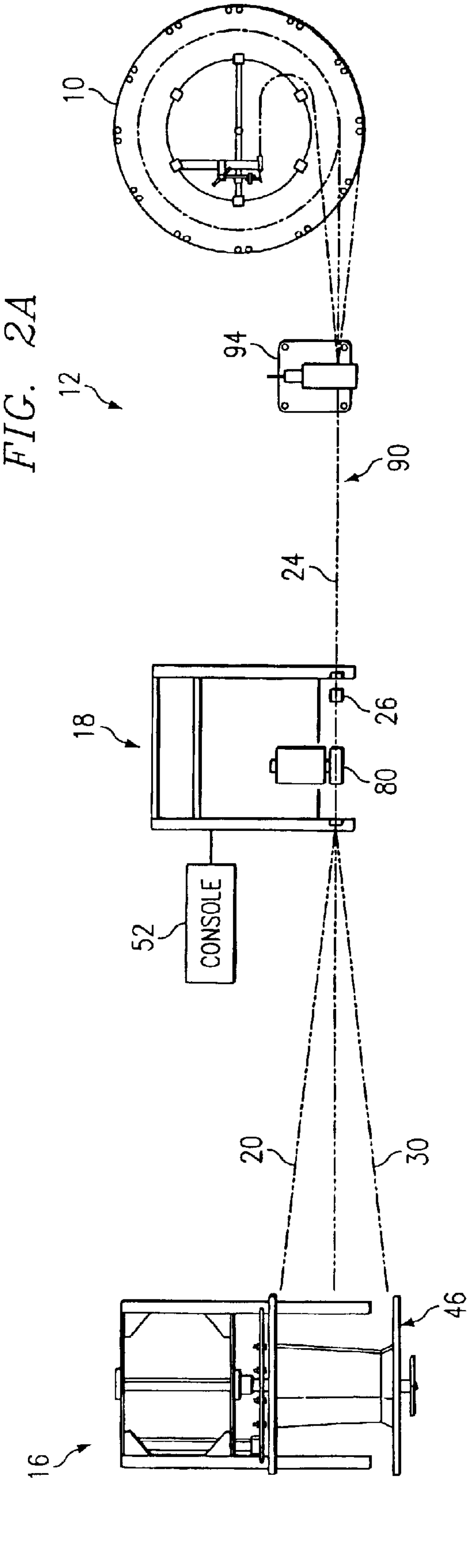
FIG. 2A is a plan view of the assembly location.
Figure 2B:
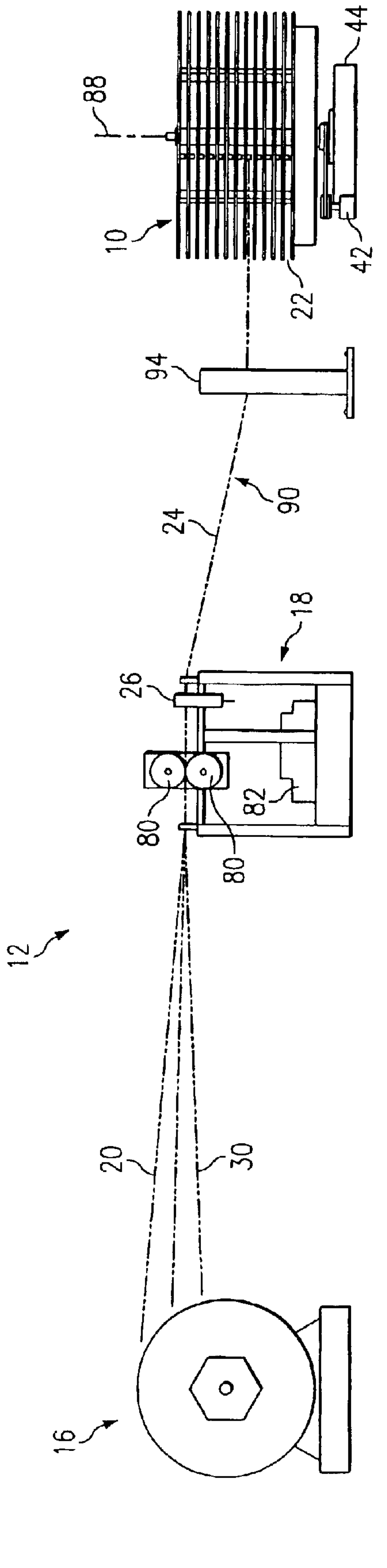
FIG. 2B is a side view of the assembly location.
Figure 4:
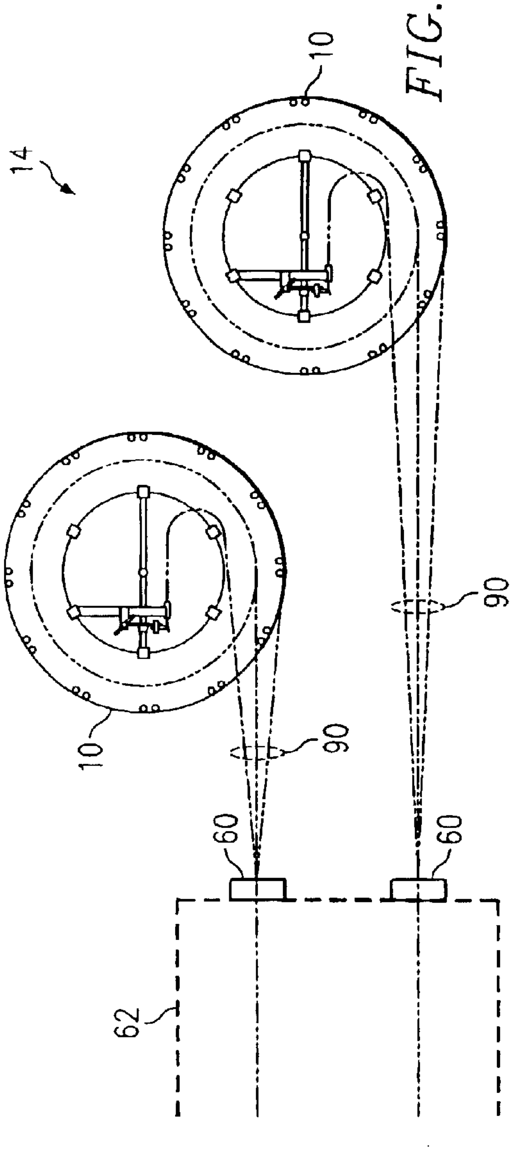
FIG. 4 is a plan view of a portion of the mold location illustrating strand reels positioned to place the strand in the mold.
Figure 10:
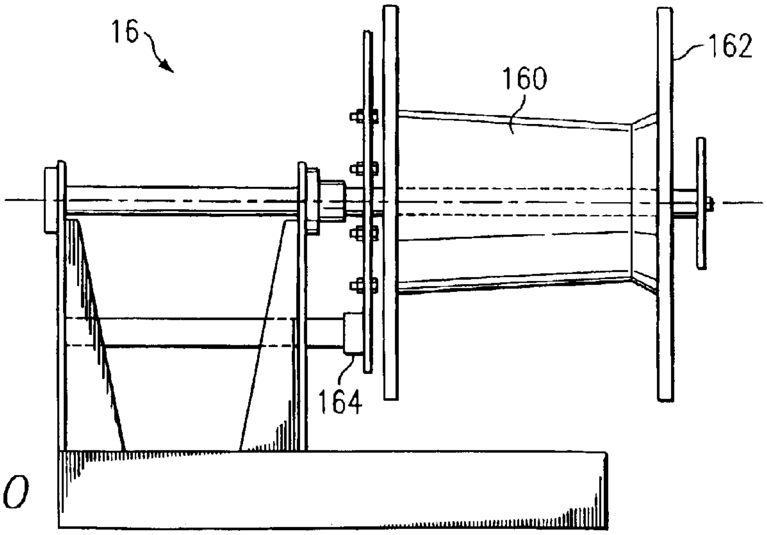
FIG. 10 is a side view of the strand pack payout device.

Now, in more detail, with reference to FIGS. 2A and 10, a strand pack 46 from a supplier, usually containing 12,000 feet of strand 30, is mounted on a rotatable reel 160 in a strand pack payout device 16 at the assembly facility and secured on the reel 160 by a drum retainer 162, which allows the strand 30 to be pulled out into a counter unit 18. The strand pack is tightly wound by the manufacturer and held together with steel banding in multiple locations. Sometimes, a length of the outer end of the strand 30 slightly longer than the distance from the strand pack payout device 16 to the counter unit 18 is left outside the steel banding. This length is wrapped around the strand pack 46 and held by only a single band. When the strand pack 46 is mounted on the strand pack payout device, this single band is cut and the outer end of the strand 30 is fed into pulling wheels 80 in the counter unit 18. Strand pack payout device 16 has a retarding brake 164 on the reel 160 which resists rotation of the reel 160 and therefore resists effort to pull strand off the strand pack in the strand pack payout device, thus inducing tension in the strand as it is pulled off to control the payout of the strand 30. The pulling wheels 80 in counter unit 18 are rotated by a power unit such as a hydraulic motor 82 to pull strand 30, which, due to the resistance of the retarding brake, establishes and maintains a predetermined pulling tension in the length 20 of the strand 30 between the payout device 16 and counter unit 18 sufficient to allow the remaining bands on the strand pack 46 to be cut safely. This tension, for example, can be as high as 5,000 pounds force. The counter unit 18 measures the length of strand 30 passing through the pulling wheels 80.

Figure 3:
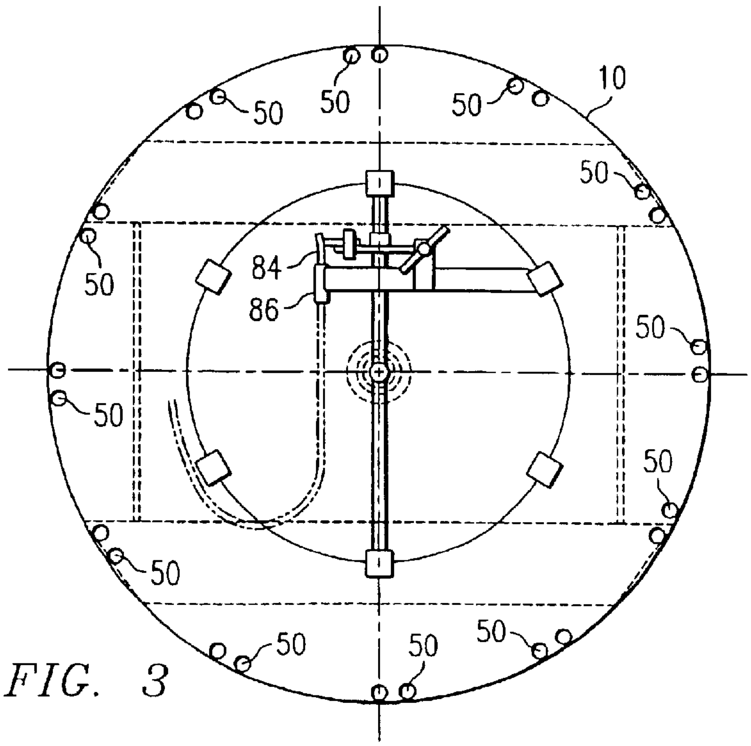
FIG. 3 is a plan view of the strand reel.

The strand 30 is then feed into one of the twelve slots 22 on the strand reel 10, with the free end 84 of the strand 30 secured to the inside of the slot, preferably by a conical wedge type strand chuck 86, as seen in FIG. 3. The strand reel 10 is supported on a strand reel winder 44 and is rotated about its vertical axis 88 by a hydraulic motor 42 in strand reel winder 44 to wind the strand 30 into a slot 22. The hydraulic motor 42 maintains tension in the length 24 of the strand 30 between the counter unit 18 and strand reel 10. The tension exerted by hydraulic motor 42 in the length 24 is less than the tension exerted in the length 20 so that the pulling wheels control the speed of strand 30. Hydraulic motor 42 exerts sufficient tension to prevent hockle in the strand 30 as it is wound in the slots. An adjustable height fairlead 94 is preferably positioned between the counter unit 18 and the strand reel 10 to help guide the strand 30. When a desired length of the strand 30 has been pulled off the strand pack 46 as measured by the counter unit 18, a spring clip or other suitable device is fit into holes 50 formed in the reel 10 to hold the portion of the strand already in the slot. A strand cutter 26 on the counter unit 18 then cuts the strand 30 to form a strand segment 90 of predetermined length. The forward end 96 of the next strand segment 90 is preferably ground to remove any burrs or ridges created by the strand cutter 26 with a suitable tool. The end can be chamfered if desired. The strand reel 10 is rotated further to take up the loose end of the strand segment 90 into the slot. The loose end of the strand segment 90 is also then held in the slot by spring clips or other suitable devices fit into holes 50. This operation is repeated until all twelve slots in the reel 10 are each filled with a strand segment 90 of the predetermined length. Any number of slots can be provided in the reel 10, such as 8, 12, 15, etc. The strand reel 10 can be sized as needed for the strand segments to be used. In one strand reel constructed in accordance with the teachings of the present invention, the diameter of the strand reel is 5 feet, with each of the 12 slots being 2 inches high and about 1 foot deep. Each slot can hold a strand segment 90 of length up to about 500 feet.

Additional strand reels 10 are filled as needed for the particular concrete product to be molded. The reels 10 can be lifted off the hydraulic strand reel winder 44 by a fork lift or crane when filled and a new, empty reel placed on the hydraulic strand reel winder 44 to receive additional strands segments 90. When sufficient reels have been filled, they are transported to the mold site 14. The operation can be controlled through a manually operated console 52 on the counter unit 18 or remotely, through a small hand held radio transmitter if desired, to avoid exposing personnel to the strand 30 as it is payed out.

It will be appreciated that it is important to maintain the strand 30 in tension at all times as the strand is pulled off the strand pack 46 and formed into strand segments 90 in the slots 22 of the strand reel. If the strand 30 is not maintained in tension, it can hockle, kink or otherwise compromise its linearity. Typically, the strand 30 is made up of a number of smaller diameter strands twisted together, for example, seven smaller diameter strands may be twisted together to form a single strand 30 (usually one center strand and six outer strands). Another advantage is that the strand 30 pulled out from the strand pack 46 is taken from the outer diameter of the pack 46, while the strand 30 taken out from a pack at the mold site is typically taken from the inner diameter of the pack, and thus more likely to require the strand 30 be rotated as it is removed from the pack to prevent hockle. The strand 30 is also very unlikely to be nicked or cut in the controlled operation at the assembly facility, a risk which is high when it is taken from a strand pack at the mold site. A nick or cut could severely compromise the strength of the strand in use. Also, the strand is less likely to be dragged across contaminating surfaces such as the ground or other surfaces so that oil, grease, dirt etc. is substantially less likely to contaminate the strand, resulting in a better concrete to steel bond and thus a stronger and safer product.

A typical strand 30 that would be used in the present invention is the ½ inch diameter 270K Oversize (13-1860) Low Relaxation Prestressing Strand such as provided by ASW. Such a strand has a minimum Breaking Strength of 45,000 lbs, a minimum 1% Yield Strength of 40,500 lbs and a minimum Elongation of 3.5%. The strand has a nominal diameter of 0.526 inches, a nominal area of 0.167 square inches and a typical Modulus of $28\times10^6$ psi. The average O.D. of the supply roll for a supply roll of 12,000 feet of strand of this type is 48.5 inches while the average I.D. is 29.5 inches. The strand roll weighs an average of 6,240 lbs and costs about $15,000.00.

Strand can vary in properties from one strand pack to another. One advantage of the present invention is that by forming a series of strand segments 90 from a single strand pack, the properties of the strand segments in the concrete product will be more uniform and it will be substantially easier to keep records of the particular batch or strand pack of strand used in the concrete product should an issue ever arise as to the quality of the strand used, since the product will generally have strand from only one strand pack.

Once the strand reels 10 have been transported to the mold site with the strand segments 90 stored in the slots therein, they are placed on stands 48 which also permit them to rotate about their vertical axis to pay out the premeasured strand segments for use in the mold 62. While mold 62 will be described as a self stressing mold, using bearing plates 60, the advantages of the present invention would be equally useful in a mold using external abutments to tension the strands.

In one procedure, the exposed ends 96 of each of the strand segments in the strand reel are freed and pulled off the strand reel to free a sufficient length of the strand segments to place the ends 96 into collars 210 with the associated rods 208 already inserted in the bearing plates and bulkheads as seen in step 1 of FIG. 1C. The strands are then pushed through the mold 62, with the strand reel 10 rotating about its vertical axis to payout the strands.

However, in another procedure, to assist in the operation, the strand feeder rack 56 can be used and is mounted for sliding motion on track 98 for movement from a position adjacent the strand reel 10 to a position adjacent the bearing plate 60, as seen in FIGS. 5 and 6. The rods 208 are inserted into the mold. The ends 96 of each of the strand segments in the strand reel 10 are unclipped and freed from the strand reel 10 and then unwound from the strand reel 10 while the reel is stationary, one strand at a time. Typically 1⅙ turn of each stand will be unwound. As the ends 96 are unwound, the ends 96 are placed in the slots 54 while the strand feeder device 56 is in the position adjacent the strand reel 10. As the strand ends 96 are inserted in the slots 54, the arm 152 is pivoted out of the way. Once the strand ends 96 are in the slots 54, the arm 152 is pivoted through positions 156A–E to capture and clamp the strand ends 96 in a wedging action between slots 54 and 154. The pivoting arm 152 is held in the wedging position 156E with a locking mechanism. The rods 208 are now backed up to capture the free ends of the strands 30, which are perhaps 6 to 12 inches from the near bearing plate 60. The strand feeder rack 56 is then slid along the track 98 proximate the near bearing plate 60 to push the rods 208 and strands 30 simultaneously through the mold 62. For example, the strand feeder rack 56 can move about 15 to 17 feet toward the near bearing plate 60, pushing the strands the same distance into the mold 62, fully through the bearing plates 60 and bulkheads 202. The rods 208 can then be removed and strand chucks 86 installed. The strand reel 10 will rotate on the stand 48 and pay out additional lengths of the strand segments as the strands are fed into the mold.

The invention has numerous advantages. Strands can be more easily fed into the bearing plate and bulkheads, reducing the time necessary to position the strands in the mold for the molding process. Less manual labor is needed and the installation crew need not tread on the slippery mold surfaces as often. With the rods 208 and collars 210 absorbing much of the initial impact of passing the strands through the bearing plate and bulkheads, the chances of damaging the strands are reduced. Strands 30 are fed simultaneously rather than sequentially.

While a single embodiment of the present invention has been illustrated in the accompanying drawings and described in the foregoing Detailed Description, it will be understood that the invention is not limited to the embodiment disclosed, but is capable of numerous rearrangements, modifications and substitutions of parts and elements without departing from the scope and spirit of the invention.

What is claimed is:

1. A method of feeding strand through apertures in members in a mold, comprising the steps of:

inserting a forward end of a rod into a first one of the apertures;

placing a collar over an end of the strand, the collar mounted to the rod for limited motion relative thereto;

placing the end of the strand into a strand feeder rack and subsequently sliding the strand feeder rack along a track from a first position to proximate the mold to push the rod, collar and end of the strand through the apertures of the members with the strand;

wherein the step of sliding the strand feeder rack includes the step of using a come-along to slide the strand feeder rack.

2. The method of claim 1 wherein the step of placing the collar over an end of the strand includes the step of frictionally engaging an inner cylindrical surface of the collar over the exterior surface of the end of the strand.

3. The method of claim 1 further comprising the step of placing the free end of the strand into a notch in said strand feeder rack.

4. The method of claim 1 further comprising the step of placing the free ends of additional strands into the strand feeder rack and placing a collar over an end of each of the additional strands, the collars mounted to rods for limited motion relative thereto, and subsequently pulling the strand feeder rack along a track from a first position to proximate the mold to push the rods, collars and ends of all of the strands into apertures of the members simultaneously.

5. A method of feeding strands through apertures in members in a mold, comprising the steps of:

placing a collar over an end of a strand, the collar mounted to a rod for limited motion relative thereto, the rod having a forward end;

inserting the forward end of the rod into a first one of the apertures;

placing the end of the strand into a strand feeder rack;

placing a second collar over an end of a second strand, the second collar mounted to a second rod for limited motion relative thereto, inserting the forward end of the second rod into a second one of the apertures and placing the end of the second strand into the strand feeder rack; and subsequently pulling the strand feeder rack along a track from a first position to proximate the mold to simultaneously push the rods, collars and strands through the apertures of the members.

6. The method of claim 5 further comprising the step of placing each of the strands in a separate slot in the strand feeder rack and wedging the strands in the slots by pivoting an arm on the strand feeder rack to capture the strands.

7. The method of claim 5 further comprising the step of pulling the strand feeder rack by use of a hand cranked winch, a come-along device, a powered device, or manually.

8. The method of claim 5 further comprising the step of moving the strand feeder rack about 17 feet along the track to insert the strands through the members in the mold.

9. A method of feeding strand through aligned apertures in members in a mold, comprising the steps of:

inserting a forward end of a rod through a first set of aligned apertures, the rod having a collar mounted to the rod for limited motion relative thereto;

placing the collar over an end of the strand while the forward end of the rod is inserted through the first set of aligned apertures; and placing the end of the strand into a strand feeder rack and subsequently sliding the strand feeder rack along a track from a first position to proximate the mold to push the rod, collar and end of the strand through the first set of aligned apertures;

wherein the step of sliding the strand feeder rack includes the step of using a hand cranked winch, a come-along device, a powered device, or manual effort to slide the strand feeder rack.

10. The method of claim 9 wherein the step of placing the collar over an end of the strand includes the step of frictionally engaging an inner cylindrical surface of the collar over the exterior surface of the end of the strand.

11. The method of claim 9 further comprising the step of placing the free end of the strand into a notch in said strand feeder rack.

12. The method of claim 9 further comprising the step of inserting the forward ends of additional rods through additional sets of aligned apertures, placing the free ends of additional strands into the strand feeder rack and placing collars over the ends of the additional strands, the collars mounted to the rods for limited motion relative thereto, and subsequently pulling the strand feeder rack along a track from a first position to proximate the mold to simultaneously push the rods, collars and ends of all of the strands through the apertures of the members.

* * * * *